United States Patent
Schleser et al.

(10) Patent No.: US 9,649,953 B2
(45) Date of Patent: May 16, 2017

(54) METHOD AND DEVICE FOR OPERATING AN ELECTRIC MACHINE OF A MOTOR VEHICLE DRIVE TRAIN

(75) Inventors: Roland Schleser, Saarbruecken (DE); Daniel Kanth, Ludwigsburg (DE); Holger Niemann, Ludwigsburg (DE); Andreas Heyl, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 13/992,043

(22) PCT Filed: Oct. 4, 2011

(86) PCT No.: PCT/EP2011/067331
§ 371 (c)(1),
(2), (4) Date: Aug. 15, 2013

(87) PCT Pub. No.: WO2012/076213
PCT Pub. Date: Jun. 14, 2012

(65) Prior Publication Data
US 2013/0317686 A1   Nov. 28, 2013

(30) Foreign Application Priority Data

Dec. 6, 2010   (DE) .................. 10 2010 062 478

(51) Int. Cl.
*B60L 15/20* (2006.01)
*H02P 29/032* (2016.01)

(52) U.S. Cl.
CPC ............ *B60L 15/20* (2013.01); *H02P 29/032* (2016.02); *B60L 2200/26* (2013.01);
(Continued)

(58) Field of Classification Search
None
See application file for complete search history.

(56) References Cited

U.S. PATENT DOCUMENTS 3,753,064 A * 8/1973 Agarwal et al. .............. 318/803
6,407,521 B1   6/2002 Raftari et al.
(Continued)

FOREIGN PATENT DOCUMENTS

CN   1606211   4/2005
DE   100 19 152   12/2000
(Continued)

OTHER PUBLICATIONS

Matsuda, JPH1118210, EPO machine translation of the written description Jun. 13, 2016.*
(Continued)

*Primary Examiner* — Fadey Jabr
*Assistant Examiner* — Kevin P Mahne
(74) *Attorney, Agent, or Firm* — Norton Rose Fulbright US LLP

(57) ABSTRACT

A method for operating an electrical machine, in particular for making available drive power for a drive train of a motor vehicle, the electrical machine being controlled by several phase currents, the method including sensing an electrical variable that represents the torque delivered by the electrical machine; and monitoring the torque. A degradation of the electrical machine is taken into consideration in the monitoring of the torque.

10 Claims, 3 Drawing Sheets

(52) U.S. Cl.
CPC ..... *B60L 2220/14* (2013.01); *B60L 2240/423* (2013.01); *Y02T 10/642* (2013.01); *Y02T 10/7258* (2013.01)

(56) References Cited

U.S. PATENT DOCUMENTS

| | | |
|---|---|---|
| 6,803,736 B1 | 10/2004 | Hommel et al. |
| 6,892,110 B2 * | 5/2005 | Inoue et al. ................. 700/175 |
| 7,301,296 B1 * | 11/2007 | Discenzo ................. 318/400.04 |
| 2008/0278869 A1 * | 11/2008 | Rehm et al. .................... 361/23 |
| 2009/0179602 A1 | 7/2009 | Hayashi et al. |
| 2010/0194316 A1 | 8/2010 | Eisenhardt |

FOREIGN PATENT DOCUMENTS

| | | |
|---|---|---|
| DE | 102 43 222 | 4/2003 |
| DE | 10 2005 049 070 | 4/2007 |
| JP | 11-18210 A * | 1/1999 |

OTHER PUBLICATIONS

International Search Report, International Application No. PCT/EP2011/067331, dated Mar. 14, 2013.

* cited by examiner

METHOD AND DEVICE FOR OPERATING AN ELECTRIC MACHINE OF A MOTOR VEHICLE DRIVE TRAIN

FIELD

The present invention relates to a method for operating an electrical machine, in particular for making available drive power for a drive train of a motor vehicle, the electrical machine being controlled by several phase currents, the method including sensing an electrical variable with which the torque delivered by the electrical machine is controlled, and monitoring the torque.

The present invention furthermore relates to a control unit for applying control to an electrical machine, which unit is set up to carry out such a method; and further relates to a motor vehicle drive train having at least one electrical machine for making available drive power, and having an associated control unit.

BACKGROUND INFORMATION

An electrical machine is commonly used by the motor vehicle drive technology sector as a sole drive system or together with a drive motor of a different type (hybrid drive system). Electrical machines are typically used as a drive motor in electric vehicles or hybrid vehicles of this kind. The electrical machine of such a drive train is often regulated in terms of the torque to be delivered. A torque management system receives a torque request on the part of a driver, and generates for a control loop of the electrical machine a target torque (which can be equal to the driver-demanded torque or can be less if, for example, a portion of the demanded torque is to be made available by a combustion engine in a hybrid drive train).

The drive train furthermore generally contains an energy reservoir, for example in the form of a high-voltage battery. The DC voltage made available by the energy reservoir is typically converted, in a power electronics system that contains an inverter, into a plurality of (typically three) phase currents or phase voltages.

The torque delivered by the electrical machine is a function of these phase currents. In order to monitor the torque, of the electrical machine, the phase currents or another variable derived therefrom (such as, e.g., a cross current) is sensed in a control unit. In the context of monitoring, a corresponding fault reaction is triggered when a permissible maximum value of that electrical variable is exceeded. The fault reaction can consist, for example, in an indication for the driver of the motor vehicle, but preferably consists in shutting off the electrical machine. Unintentional triggering of a fault reaction can occur in this context.

SUMMARY

In accordance with the present invention, an example method is provided for operating an electrical machine, in particular for making available drive power for a drive train of a motor vehicle, the electrical machine being controlled by several phase currents, having the steps of sensing an electrical variable that represents the torque delivered by the electrical machine, and monitoring the torque, in particular on the basis of the sensed electrical variable, a degradation of the electrical machine being taken into consideration in the monitoring of the torque. The electrical machine can be embodied in particular as a phase-sequence electrical machine.

An example control unit is also provided for applying control to an electrical machine, in particular for making available drive power for a drive train of a motor vehicle, the control unit being set up to carry out such a method.

Lastly, the present invention relates to a motor vehicle drive train having at least one electrical machine for making available drive power, and having a control unit of the kind described above.

The electrical variable that represents the torque delivered by the electrical machine is preferably an electrical variable with which the torque delivered by the electrical machine is controlled in open- or closed-loop fashion, in particular an electric current.

In electrical machines, efficiency can deteriorate as aging proceeds. This applies in particular to electrical machines in the form of permanent-magnet excited electrical machines, for example synchronous machines. The permanent magnets used in such electrical machines are subject to an aging process that can be accelerated, for example, by high temperatures, short-term overcurrents, etc. This results in a partial demagnetization of the permanent magnets being used. It may be necessary as a result to increase the power consumption in order to achieve the requested power output, in particular to achieve a commanded torque.

The increased power consumption as the degradation of an electrical machine progresses can cause fault reactions to be incorrectly triggered in the context of torque monitoring.

The feature of considering a degradation of the electrical machine in the context of torque monitoring makes it possible, for example, to avoid such unintentional fault reactions. The availability of the electrical machine and of the drive train can thereby be increased.

In particular, it is possible in the context of a brand new electrical machine to design the maximum limits for torque monitoring in such a way that unintentional overcurrents can be avoided. The service life of the electrical machine can thereby also be extended.

It is particularly advantageous in this context if at least one monitoring parameter is modified as a function of the degradation of the electrical machine. It is particularly preferred in this context if that monitoring parameter is a maximum value of the electrical variable or a value dependent thereon.

For example, the maximum value can be increased as the degradation of the electrical machine progresses. The result that can be achieved thereby is that at the beginning of the service life, overcurrents can be reliably avoided without unintentionally triggering fault reactions. As degradation progresses, generally concomitantly with the progress of operating time, such maximum values can then be increased, since higher currents need to be consumed by the electrical machine in order to achieve specific torques.

According to a further embodiment, at least one further electrical variable, with which a redundant monitoring of the torque is carried out, is sensed.

The result that can be achieved thereby is that fault reactions can be triggered with greater reliability.

It is possible in general to estimate the degradation of the electrical machine. This can be accomplished, for example, by establishing the degradation as a function of one or more of the following parameters: elapsed calendar time, operating time of the electrical machine, operating time of the electrical machine at a current above a threshold value, operating time of the electrical machine at a temperature above a threshold value, operating time of the electrical machine at a torque above a threshold value.

It is thereby possible to estimate the degradation of the electrical machine effectively, and to carry out the torque monitoring on the basis thereof.

It is furthermore particularly preferred if at least one further electrical variable, with which the extent of the degradation is ascertained, is sensed.

In this embodiment an estimate of the degradation is not absolutely necessary. It is possible instead, to determine the degradation relatively accurately by way of an evaluation of the further electrical variable. This is accomplished preferably by way of a trend analysis.

It is preferred here if at least one monitoring parameter is modified as a function of the ascertained extent of the degradation of the electrical machine.

It is moreover advantageous overall if at least one phase current, or a cross current transformed therefrom, of the electrical machine is sensed as an electrical variable, and/or if a DC voltage power, which is supplied to an inverter in order to generate the phase currents, is sensed as a further electrical variable.

As mentioned above, degradation of an electrical machine can result in at least partial demagnetization of permanent magnets. This causes ohmic losses (reactive power) to rise, and efficiency to drop. If the electrical machine is being controlled or regulated using the phase currents, sensing of only those currents or of variables derived therefrom can cause the delivered torque to be less (as a result of the degradation) than expected by the control system.

In a current control system of this kind, the phase voltages drop and consequently the DC voltage power fed into the inverter also decreases. The DC voltage power can consequently be used to plausibilize the torque monitoring on the basis of the phase currents (or variables derived therefrom).

It is further advantageous overall if the sensing of the electrical variable and/or of a further electrical variable is accomplished for a plurality of operating points of the electrical machine.

It is thereby possible to monitor the torque on the basis of a characteristics diagram that is gathered from the plurality of operating points. The operating points can, for example, be a function of the rotation speed of the electrical machine, or a function of the temperature of the electrical machine.

DETAILED DESCRIPTION OF EXAMPLE EMBODIMENTS

Figure 1:
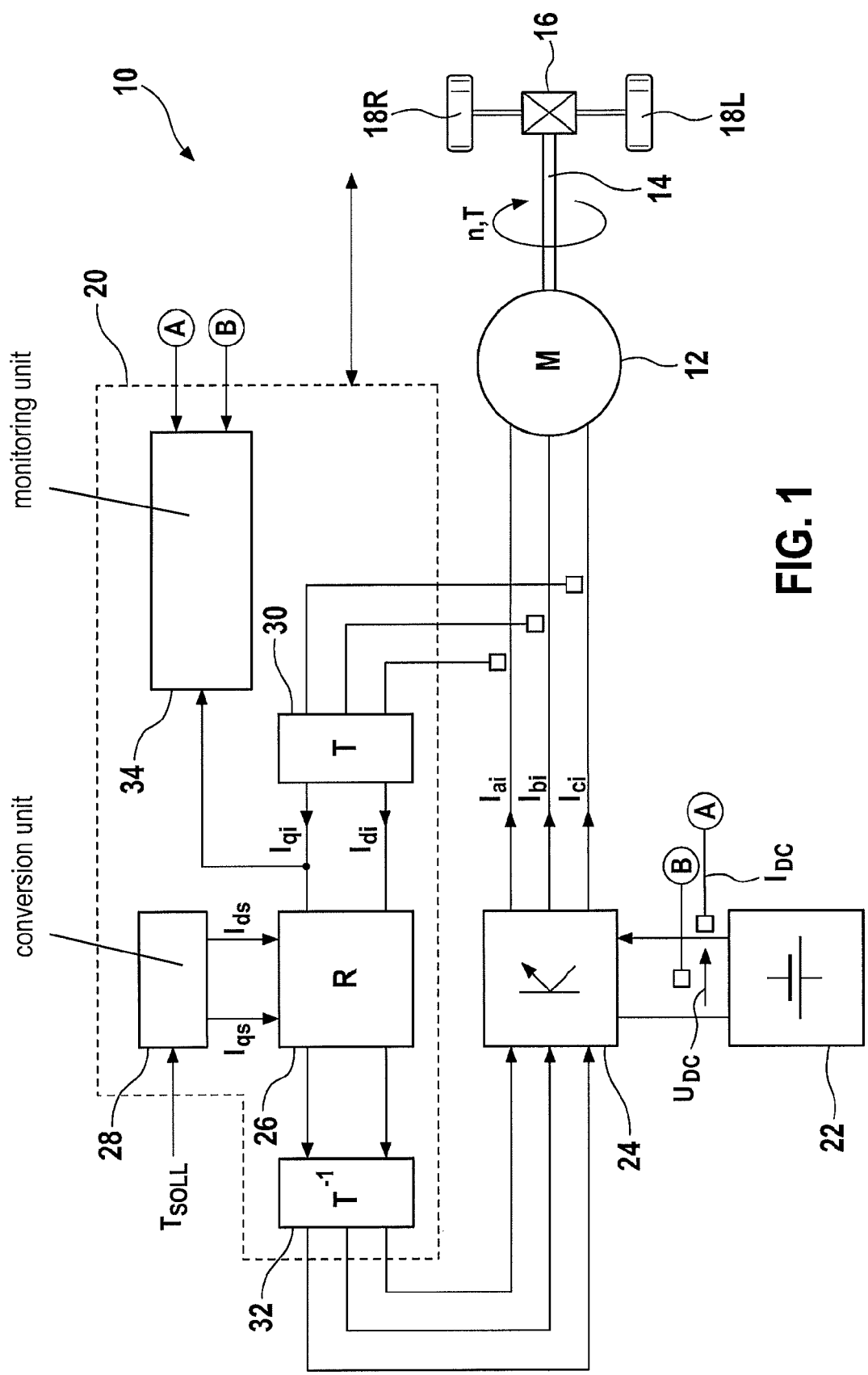
FIG. 1 shows in schematic form a motor vehicle drive train according to an embodiment of the present invention.

In FIG. 1, a drive train for a motor vehicle is labeled in general as 10. Drive train 10 has an electrical machine 12 in the form of an electrical machine. The electrical machine is preferably a permanent-magnet excited electrical machine, in particular a synchronous machine. An output shaft 14 of electrical machine 12 is connected to a differential 16 that distributes drive power of electrical machine 12 to driven wheels 18L, 18R of the motor vehicle. Output shaft 14 rotates at a rotation speed n and makes available a torque T.

Drive train 10 can be embodied as an entirely electrical drive train in which only electrical machine 12 makes drive power available. Alternatively thereto, drive train 10 can also additionally have further electrical machines and/or a further drive motor, such as a combustion engine, in order to constitute a hybrid drive train. It is understood in this context that the drive train can optionally also have one or more separator clutches as well as a multiple-ratio or stepless transmission.

A control unit 20 is provided in order to apply control to electrical machine 12. Control unit 20 can be provided especially for electrical machine 12 but can also be part of a higher-order control unit of the drive train.

Drive train 10 further has a DC voltage supply 22 that preferably contains a high-voltage battery. DC voltage supply 22 makes available a DC voltage $U_{DC}$ at its output poles, and can supply a current $I_{DC}$. A power electronics system having an inverter 24 is connected to DC power supply 22. The inverter can have, in a conventional manner, a plurality of power switches to which control can be applied. The power switches are controlled in pulse width modulated fashion by way of control unit 20, so that in motor mode, electrical machine 12 generates a specific torque T at a specific rotation speed n of output shaft 14. Inverter 24 makes available at its output, at three phases, respective phase currents $I_{ai}$, $I_{bi}$, $I_{ci}$ that flow into stator windings of electrical machine 12. The stator windings are preferably interconnected in a star circuit configuration.

Control unit 20 has a controller 26 that is connected to a conversion unit 28. A target torque $T_{SOLL}$, which can correspond, e.g., to a driver-commanded torque or to a portion of that torque (in the case of hybrid operation), is inputted into conversion unit 28. In conversion unit 28, this target torque $T_{SOLL}$ is converted into a target cross current $I_{qs}$ and into a target longitudinal current $I_{ds}$.

Controller 26 is designed to carry out field-oriented control of electrical machine 12 (also called "vector control"), in which a space vector (e.g., a current vector) that rotates with the output shaft of the electrical machine is moved. In other words, the phase currents $I_a$, $I_b$, $I_c$ needed in order to apply control to the electrical machine are converted into a rotor-based coordinate system (called a "dq system") co-rotating with the magnetic field of electrical machine 12. In field-oriented control it is then the current components transformed in this manner, namely $I_d$ (longitudinal current) and $I_q$ (cross current), that are controlled, rather than the phase currents.

At least two of the phase currents $I_a$, $I_b$, $I_c$ are measured as actual values and conveyed to a transformation function 30 that converts the phase currents into an actual cross current $I_{qi}$ and an actual longitudinal current $I_{di}$. These actual values are inputted into controller 26. It is further understood that it can also be useful, for controlling electrical machine 12, to measure the rotation speed n of output shaft 14 and input it into controller 26, even though this is not depicted in FIG. 1.

A control algorithm is then carried out in controller 26 on the basis of the target and actual current components, and the output of controller 26 is connected to an inverse transformation function 32 that converts the control application in turn into the phases of electrical machine 12. These control application signals are then conveyed to inverter 24.

Control unit 20 further contains a monitoring unit 34 for monitoring the torque T delivered by electrical machine 12. The actual cross current $I_{qi}$ is inputted into monitoring device 34. The DC voltage $U_{DC}$ and DC current $I_{DC}$ are also inputted into monitoring device 34 so that the DC voltage power $P_{DC}$ consumed by inverter 24 can be calculated.

Monitoring device 34 serves to monitor whether the torque T delivered by electrical machine 12 exceeds permissible maximum values. In that case a fault reaction can be triggered by monitoring device 34. The fault reaction can be, for example, a display, a communication to other control units, and/or an immediate shutoff of electrical machine 12.

Figure 2:
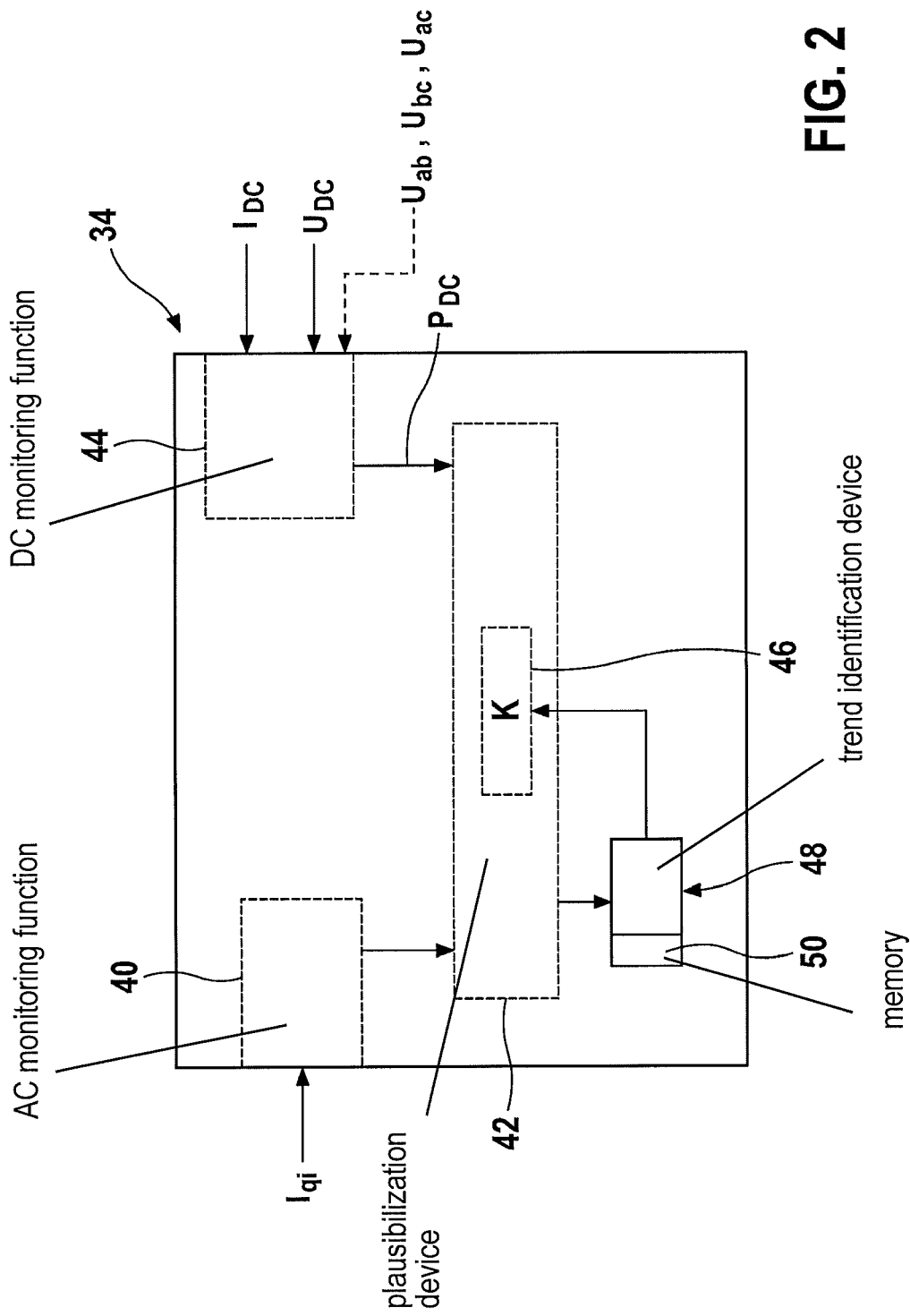
FIG. 2 shows in schematic form a torque monitoring function of a control unit according to the present invention.

Monitoring device 34 is schematically depicted in FIG. 2. An AC monitoring function 40 determines whether the actual cross current $I_{qi}$, which represents the torque T delivered by electrical machine 12, exceeds a permissible maximum value.

Figure 3:
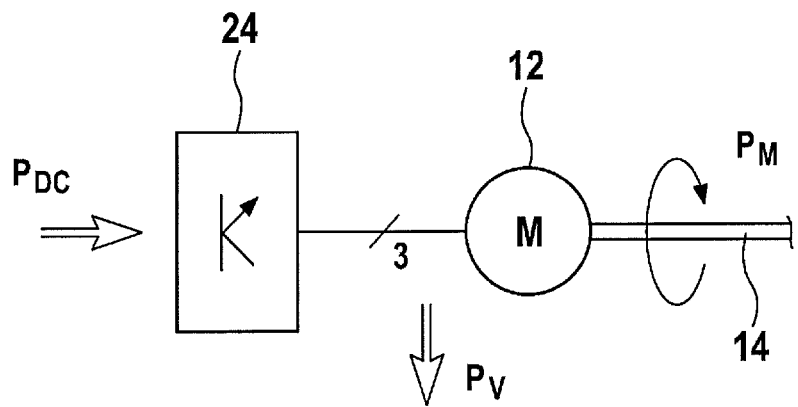
FIG. 3 shows in schematic form the power flow in the context of operation of the electrical machine.

Because monitoring device 34 involves a safety-relevant function, a plausibilization of AC monitoring function 40 preferably occurs. For this, firstly the DC voltage power $P_{DC}$ is calculated in a DC monitoring function 44 ($P_{DC}=I_{DC}*U_{DC}$). An output of AC monitoring function 40, and the DC power $P_{DC}$, are inputted into a plausibilization device 42. In plausibilization device 42, a plausibilization of the actual cross current $I_{qi}$ occurs using the electrical DC voltage power $P_{DC}$. A redundant monitoring of the torque T can thereby be achieved, making use of the fact that ideally, the same power dissipation $P_V$ always exists at a specific operating point n,T. This is schematically depicted in FIG. 3. Inverter receives the DC voltage power $P_{DC}$, and a mechanical power $P_M$ is delivered by electrical machine 12 at output shaft 14. Losses occur in inverter 24 and in electrical machine 12 (and if applicable in leads), and are represented in FIG. 3 by a power dissipation $P_V$, such that:

$$P_M=P_{DC}-P_V.$$

The mechanical power $P_M$ is calculated as $P_M$=2 pi*n*T. The delivered torque T is consequently calculated as $$T=(U_{DC}*I_{DC}-P_V)/2*pi*n,$$

where the torque T is a function of the magnetic flux phi and the actual cross current $I_{qi}$.

Expressed a different way around, the power dissipation $P_V$ can be calculated as $$P_V=U_{DC}*I_{DC}-2*pi*n*T.$$

Because the power dissipation $P_V$ ideally remains the same for different operating points n,T, it is therefore possible to ascertain, by calculating the DC voltage power $P_{DC}$, whether the actual torque ascertained by AC monitoring function 40 is in fact being made available.

Figure 4:
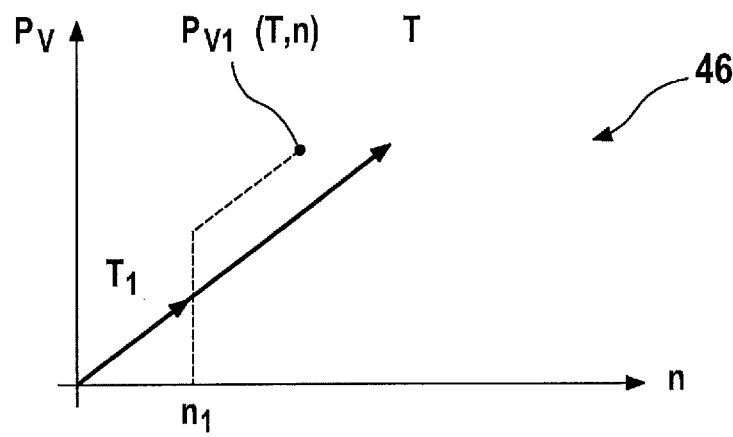
FIG. 4 shows in schematic form a characteristics diagram of a power dissipation value plotted against torque and against rotation frequency.

FIG. 4 presents a diagram or characteristics diagram of power dissipation $P_V$ plotted against torque T and rotation speed n (diagram 46), showing a predefined power dissipation $P_{V1}$ for an operating point $T_1,n_1$.

In electrical machines, the behavior described above can change as degradation progresses. In particular, degradation of permanent magnets of a permanent-magnet excited electrical machine, in particular of a synchronous machine, can occur. The degradation or aging of the permanent magnets can be brought about by a variety of mechanisms. For example, partial demagnetization of the permanent magnets being used can occur as a result of overheating and/or short-term overcurrents. The efficiency of the electrical machine decreases as a result. Because controller 26 controls the electrical machine in terms of electric current, specific phase currents $I_a$, $I_b$, $I_c$ can continue to be established even in the context of a degraded electrical machine. Because of the degradation of the permanent magnets, however, only a lower power level can be transferred from the electrical into the mechanical system. In other words, the ohmic losses (reactive power) rise. This is, however, as a rule not detected by AC monitoring function 40 alone. Plausibilization device 42 allows the lower actual torque T to be detected, however, since the power consumption of electrical machine 12 decreases (the phase voltages decrease). As mentioned, plausibilization routine 42 makes use of the diagram or characteristics diagram 46, which is also depicted in FIG. 2.

To allow a specific torque T to continue to be made available, the phase currents $I_a$, $I_b$, $I_c$, provided for that purpose must rise as the degradation of electrical machine 12 progresses. The result of this is either that the maximum values of the torque could be increased in AC monitoring function 40 or plausibilization function 42 from the beginning of the service life of electrical machine 12 in order to anticipate from the outset the tolerances to be taken into account as the service life progresses. When currents are relatively high at the beginning of the service life, however, this can result in delayed triggering of a fault reaction. If, however, the maximum values of monitoring device 34 are set from the outset for a non-degraded electrical machine 12, premature or unintentional triggerings of fault reactions can occur as degradation progresses.

Figure 5:
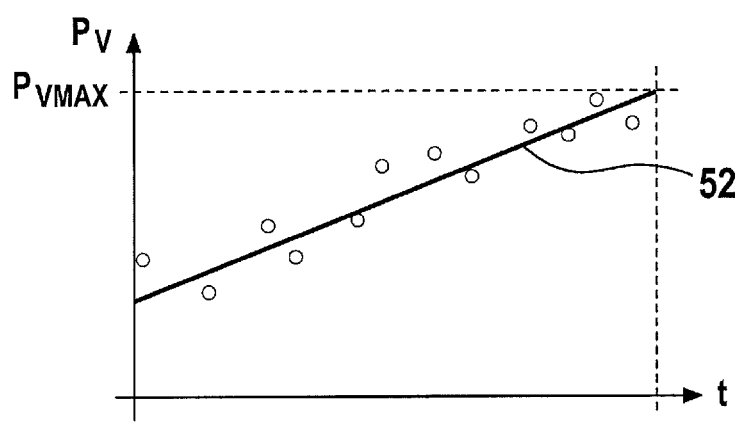
FIG. 5 shows in schematic form a diagram of the power dissipation of an electrical machine over time.

As shown in FIG. 2, using a trend identification device 48 it is possible to ascertain whether a degradation of electrical machine 12 has taken place. Here the respectively ascertained power dissipation values $P_V$ are plotted against time, for example in a memory 50 of trend identification device 48. A plot of such power dissipation values $P_V$ against time is depicted in FIG. 5. The presentation of power dissipation $P_V$ corresponds here to a specific operating point (for example, to the operating point $P_{V1}$ of FIG. 4). It is evident that the power dissipation at this operating point rises over time, depicted by a trend line 52 having an upward slope greater than zero. As soon as it is ascertained not merely that a temporarily elevated power dissipation is present as a result of transient conditions, but that in fact there is an upward trend in the power dissipation, characteristics diagram 46 can be adapted in suitable fashion. Alternatively or additionally thereto, the maximum values of monitoring device 34 can be adapted. Adaptation of the characteristics diagram of power dissipation $P_V$, however, allows plausibilization device 42 to continue to work with the same algorithms, while the degradation of electrical machine 12 is taken into consideration.

The identification of the power dissipation level can occur, for example, at each driving cycle (a driving cycle begins when drive train 10 is switched on and ends when it is shut off). Only when the degradation trend is confirmed over several such driving cycles is characteristics diagram 46 adapted and used in the future to carry out the power output balance calculation ($P_M=P_{DC}-P_V$).

FIG. 5 further depicts, at $P_V$, a maximum value that corresponds to a maximum permissible degradation. If the power dissipation $P_V$ rises above this value as a result of degradation of electrical machine 12, a fault message is outputted or electrical machine 12 is shut down.

In addition, a model for the degradation can also be stored in plausibilization device 42. The recalculation of characteristics diagram 46 can also occur, for example, as a function of temperature. For example, very high temperatures can be an indication that a degradation of electrical machine 12 has actually taken place. Instead of being based on a maximum value $P_{VMAX}$, a shutdown can also occur when the rate of change in trend line 52 rises above a specific threshold value.

In the embodiment described above, the degradation of electrical machine 12 is ascertained by way of plausibilization device 42 and is used to update characteristics diagram 46.

A degradation of the electrical machine can also occur, however, on the basis of other parameters, for example on the basis of ordinary aging that can occur as a result of elapsed time (the older the electrical machine 12, the more degraded it is), and/or operating time (the more often electrical machine 12 has been used, the more degraded it is), and the detection of degradation can also be made dependent on the fact that the electrical machine has been operated with currents above a threshold value, with torques above a threshold value, at temperatures above a threshold value, and/or at rotation speeds above a threshold value.

As mentioned above, plausibilization device 42 can work by way of the DC voltage power $P_{DC}$. It is alternatively possible to monitor phase voltages $U_{ab}$, $U_{bc}$, $U_{ac}$. In the presence of a degradation of electrical machine 12, these phase voltages change for a defined operating point in a context of regulated phase currents.

It is understood that the description above is valid in general for a particular operating point. It is also understood, however, that the above functions and routines can also be respectively carried out for a plurality of operating points. Further parameters can moreover also be incorporated, for example the temperature at a specific operating point, etc.

What is claimed is:

1. A method for operating an electrical machine for making available drive power for a drive train of a motor vehicle, the electrical machine being controlled by several phase currents, the method comprising:

sensing a first electrical variable that represents torque delivered by the electrical machine;

sensing a second electrical variable that represents a DC voltage power supplied to an inverter to generate the phase currents;

monitoring the torque by comparing the first sensed electrical variable to a maximum threshold torque value, wherein a degradation of the electrical machine is taken into consideration in the monitoring of the torque;

further monitoring the torque by performing a plausibility check based on the first sensed electrical variable and the second sensed electrical variable;

generating a current, wherein the degradation of the electrical machine is taken into consideration and;

controlling the electrical machine with the current to compensate for the degradation of the electrical machine.

2. The method as recited in claim 1, wherein a maximum value of the electrical variable is modified as a function of the degradation of the electrical machine.

3. The method as recited claim 1, wherein at least one further electrical variable, with which an extent of the degradation is ascertained, is sensed.

4. The method as recited in claim 3, wherein at least one monitoring parameter is modified as a function of the ascertained extent of the degradation of the electrical machine.

5. The method as recited in claim 1, wherein one of: i) at least one phase current, or ii) a cross current transformed therefrom, of the electrical machine is sensed as an electrical variable.

6. The method as recited in claim 1, wherein the sensing of the electrical variable is accomplished for a plurality of operating points of the electrical machine.

7. The method as recited in claim 1, wherein the sensing of a further electrical variable is accomplished for a plurality of operating points of the electrical machine.

8. A control unit for controlling an electrical machine for making available drive power for a drive train of a motor vehicle, the control unit configured to perform the following:

sense a first electrical variable that represents torque delivered by the electrical machine;

sense a second electrical variable that represents a DC voltage power supplied to an inverter to generate phase currents to control the electrical machine;

monitor the torque by comparing the first sensed electrical variable to a maximum threshold torque value, wherein a degradation of the electrical machine is taken into consideration in the monitoring of the torque;

further monitor the torque by performing a plausibility check based on the first sensed electrical variable and the second sensed electrical variable;

generate a current, wherein the degradation of the electrical machine is taken into consideration; and control the electrical machine with the current in order to compensate for the degradation of the electrical machine.

9. A motor vehicle drive train having at least one electrical machine for making available drive power, and having a control unit for controlling the electrical machine, the control unit configured to perform the following:

sense a first electrical variable that represents torque delivered by the electrical machine;

sense a second electrical variable that represents a DC voltage power supplied to an inverter to generate the phase currents;

monitor the torque by comparing the first sensed electrical variable to a maximum threshold torque value, wherein a degradation of the electrical machine is taken into consideration in the monitoring of the torque;

further monitor the torque by performing a plausibility check based on the first sensed electrical variable and the second sensed electrical variable;

generate a current, wherein the degradation of the electrical machine is taken into consideration; and control the electrical machine with the current in order to compensate for the degradation of the electrical machine.

10. A method for operating an electrical machine for making available drive power for a drive train of a motor vehicle, the electrical machine being controlled by several phase currents, the method comprising:

sensing a first electrical variable that represents torque delivered by the electrical machine;

sensing a second electrical variable that represents a DC voltage power supplied to an inverter to generate the phase currents;

monitoring the torque by comparing the first sensed electrical variable to a maximum threshold torque value, wherein a degradation of the electrical machine is taken into consideration in the monitoring of the torque, and wherein one of: i) at least one phase current, or ii) a cross current transformed therefrom, of the electrical machine is sensed as an electrical variable;

further monitoring the torque by performing a plausibility check based on the first sensed electrical variable and the second sensed electrical variable;

generating a current, wherein the degradation of the electrical machine is taken into consideration; and
controlling the electrical machine with the current to compensate for the degradation of the electrical machine.

* * * * *